United States Patent Office 3,050,349
Patented Aug. 21, 1962

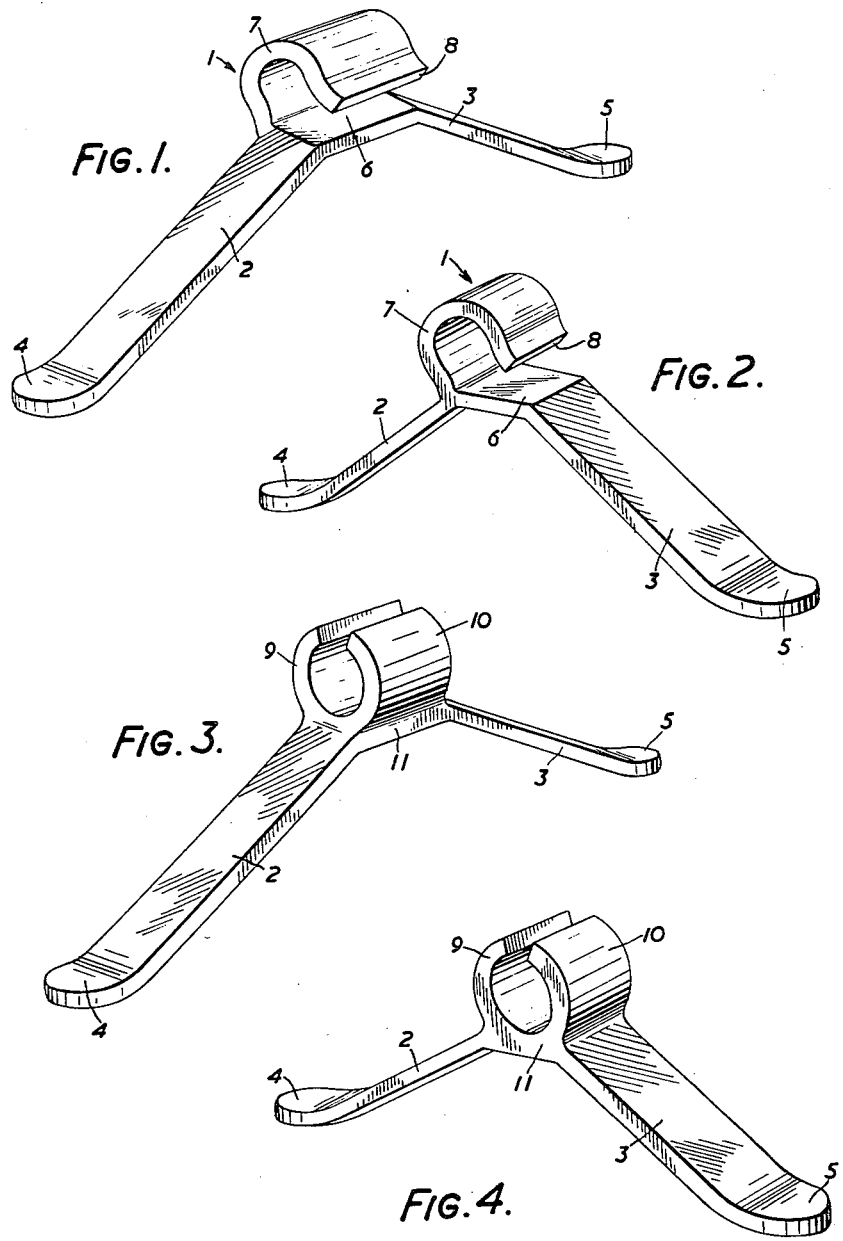

3,050,349
MEANS FOR RESILIENTLY SUPPORTING A ROD OR THE LIKE
James Bertie Leonard Christian, Shirley, Birmingham, England, assignor to United-Carr Fastener Corporation, Wilmington, Del., a corporation of Delaware
Filed Dec. 31, 1959, Ser. No. 863,257
1 Claim. (Cl. 308—26)

This invention relates to a device for resiliently supporting a rod and which is useful for supporting a rod which is subject to vibration.

The present invention provides a device for resiliently supporting a rod, the device being made from resilient synthetic plastic material or rubber and comprising a head portion shaped for holding the rod in snapping engagement so that the rod is slidable in a bore in the head portion and two or more legs integral with and extending from the head portion and inclined outwardly to one another for supporting the device on a surface.

The material from which the device is made is chosen so that although the two or more legs are resiliently displaceable from their normal position, any vibrations to which a rod mounted in the head portion is subject are damped by the device. In this sense, therefore, the material chosen must be semi-resilient.

Embodiments of the present invention will now be described, by way of example with reference to the accompanying drawing, of which, FIGURE 1 is a perspective view of a device for resiliently supporting a rod, and FIGURES 2 to 4 show modifications of the device.

With reference to the accompanying drawing, FIGURE 1 shows a device for resiliently supporting a rod (not shown) and which comprises a head portion 1 and two legs 2, 3 for supporting the device on a surface (not shown). As shown, the legs 2, 3 are integral with and extend from the head portion 1 and are inclined outwardly from one another. Each leg 2, 3 is formed at its free end with an outwardly turned foot 4, 5. The device is an integral moulding of polyethylene.

The head portion 1 has a flat base 6 and a hook 7 which is shaped to hold a rod in snapping engagement so that the rod is slidable in the head portion 1. The free end 8 of the hook 7 is flared to facilitate snapping of the rod between the end 8 and the base 6 into the axial bore which the hook 7 and base 6 form.

The legs 2, 3 extend from opposite ends of the base 6 and are resiliently displaceable toward and away from one another in a direction parallel to the longitudinal axis of the axial bore in the head portion 1.

In use of the device, a rod is snapped into the axial bore in the head portion 1 and the legs 2, 3 are arranged to contact a supporting surface at their feet 4, 5 so that the legs 2, 3 are splayed outwardly from their normal position. Thus the legs 2, 3 are firmly held against the supporting surface and the rod is resiliently supported. If the rod is subjected to vibration, the semi-resilient nature of the material from which the device is made damps out the vibrations in the rod.

The device shown in FIGURE 2 differs from that shown in FIGURE 1 in that the head portion 1 has been displaced through a right angle. The legs 2, 3 in FIGURE 2 extend from opposite edges of the base 6 and are resiliently displaceable in a direction perpendicular to the longitudinal axis of the axial bore in the head portion 1.

According to an alternative embodiment shown in FIGURE 3, the head portion of the device comprises two opposed arms 9, 10 extending from opposite sides of the base 11. The arms 9, 10 are arcuately shaped for receiving a rod therebetween and form a bore in which the rod is slidable. The free ends of the arms 9, 10 are spaced apart to provide a gap to allow the rod to be snapped between the arms. If desired, the free ends of the arms 9, 10 may be flared to serve as a lead to facilitate insertion of the rod.

As shown in FIGURE 3, the legs 2, 3 are resiliently displaceable in a direction parallel to the longitudinal axis of the bore formed by the arms 9, 10, while FIGURE 4 shows a device which differs from the device shown in FIGURE 3 in that the legs 2, 3 are resiliently displaceable in a direction perpendicular to the longitudinal axis of the bore.

If desired one of the opposed arms may be shorter than the other so that when the device is standing on its legs, the head portion has a C or like shape.

The device may be provided with more than two legs if so desired.

The device is useful for supporting a remote control rod for operating a door latch of a motor vehicle and dampens any vibrations which may be set up in the rod and cause the rod to rattle. It will be understood however that the invention is not limited to this particular use but can be employed for supporting any rod-like element.

I claim:

A plastic device for supporting a rod or the like comprising a head portion and a series of plate-like resilient legs, said head portion having a base and an arcuate yieldable slotted portion for receiving a movable rod or the like therein, said resilient legs being in integral angular relation to said base forming an arcuate bridge therewith and having a length at least twice as great as said base and said legs each having a free end with an outwardly turned foot, said foot in substantially parallel relationship with the plane of said base whereby said resilient legs and said head portion provide a yieldable supporting means for damping vibrations of the rod or the like.

References Cited in the file of this patent

UNITED STATES PATENTS

| | | |
|---|---|---|
| 934,084 | Mills | Sept. 14, 1909 |
| 1,016,281 | Lundquist | Feb. 6, 1912 |
| 1,140,145 | Finger | May 18, 1915 |
| 1,474,593 | Jennings | Nov. 20, 1923 |
| 1,729,531 | Wolever | Sept. 24, 1929 |
| 2,003,837 | Skoglund | June 4, 1935 |
| 2,115,696 | Ashley | May 3, 1938 |